US009844874B2

(12) United States Patent
Abroug

(10) Patent No.: US 9,844,874 B2
(45) Date of Patent: Dec. 19, 2017

(54) METHOD FOR CONTROLLING A SEGMENT OF AN ARM OF A CO-MANIPULATOR

(71) Applicant: COMMISSARIAT A L'ENERGIE ATOMIQUE ET AUX ENERGIES ALTERNATIVES, Paris (FR)

(72) Inventor: Neil Abroug, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 51 days.

(21) Appl. No.: 14/904,728

(22) PCT Filed: Jul. 8, 2014

(86) PCT No.: PCT/EP2014/064632
§ 371 (c)(1),
(2) Date: Jan. 13, 2016

(87) PCT Pub. No.: WO2015/010897
PCT Pub. Date: Jan. 29, 2015

(65) Prior Publication Data
US 2016/0136811 A1    May 19, 2016

(30) Foreign Application Priority Data
Jul. 26, 2013   (FR) ...................................... 13 57392

(51) Int. Cl.
*G05B 15/00* (2006.01)
*G05B 19/00* (2006.01)
(Continued)

(52) U.S. Cl.
CPC ........... *B25J 9/1638* (2013.01); *B25J 9/1641* (2013.01); *H02P 6/08* (2013.01); *Y10S 901/02* (2013.01)

(58) Field of Classification Search
CPC . B25J 9/16; B25J 9/1638; B25J 9/1641; B25J 9/1667; B25J 9/1674; B25J 9/1697; H02P 6/08; Y10S 901/02
See application file for complete search history.

(56) References Cited

U.S. PATENT DOCUMENTS 7,389,974 B2 *  6/2008  Garrec ..................... B25J 9/104
                                                    254/394
7,574,939 B2 *  8/2009  Garrec ..................... B25J 9/104
                                                    74/490.03
(Continued)

FOREIGN PATENT DOCUMENTS

FR      2 852 265 A1    9/2004
FR      2 852 373 A1    9/2004
(Continued)

OTHER PUBLICATIONS

International Search Report for PCT/EP2014/064632 dated Aug. 29, 2014 [PCT/ISA/210].
(Continued)

*Primary Examiner* — Rachid Bendidi
(74) *Attorney, Agent, or Firm* — Sughrue Mion, PLLC

(57) ABSTRACT

A method for controlling an actuator of a hinged segment including the steps of: estimating an inertia J of the segment and a minimum viscous hinge friction f; estimating or measuring a traveling speed Ẋ of the segment and an internal deformation ΔX of the actuator; synthesizing a control law $H_\infty$ generating a control current (or torque) from the estimates or measurements and meeting a performance objective pertaining to a transfer function (I) between an acceleration Ẍ of the segment and an external force F to which the segment is subjected: (II) with (III), ϵ being a mathematical artifact and s being the Laplace variable; and controlling the actuation of the hinged segment according to the control law thus synthesized.

2 Claims, 2 Drawing Sheets

(51) Int. Cl.
*B25J 9/16* (2006.01)
*H02P 6/08* (2016.01)

(56) References Cited

U.S. PATENT DOCUMENTS

| | | | |
|---|---|---|---|
| 8,525,460 B2* | 9/2013 | Reiland | B25J 9/1641 267/277 |
| 9,239,100 B1* | 1/2016 | Weber | F16H 57/025 |
| 2003/0074990 A1* | 4/2003 | Garrec | F16H 25/20 74/89.37 |
| 2006/0169086 A1 | 8/2006 | Garrec | |
| 2006/0191362 A1 | 8/2006 | Garrec | |
| 2011/0190934 A1 | 8/2011 | Reiland et al. | |

FOREIGN PATENT DOCUMENTS

| | | |
|---|---|---|
| JP | 5-297907 A | 11/1993 |
| JP | 2005-349555 A | 12/2005 |
| JP | 2012-203589 A | 10/2012 |

OTHER PUBLICATIONS

Written Opinion for PCT/EP2014/064632 dated Aug. 29, 2014 [PCT/ISA/237].

\* cited by examiner

METHOD FOR CONTROLLING A SEGMENT OF AN ARM OF A CO-MANIPULATOR

CROSS REFERENCE TO RELATED APPLICATIONS

This application is a National Stage of International Application No. PCT/EP2014/064632, filed on Jul. 8, 2014, which claims priority from French Patent Application No. 13 57392, filed on Jul. 26, 2013, the contents of all of which are incorporated herein by reference in their entirety.

The invention relates to a method for controlling a segment of arm of a co-manipulator, such as a master manipulator, a cobot or an exoskeleton.

TECHNOLOGICAL BACKGROUND OF THE INVENTION

In robots co-manipulating with a human operator (for example a master manipulator, a cobot or an exoskeleton), actuators are used for maneuvering the mobile segments, such as for example a cable-driven jack equipped with an electric motor. These motors are generally good speed generators, but not as good torque generators. It therefore often turns out to be necessary to use a reducer allowing the delivered torque to be amplified, at the expense of a reduction in the speed. These reducers can reach amplification ratios of the order of 100. It is known that, from the point of view of the operator, the inertia of the motor is multiplied by the square of the amplification ratio, such that even if the chosen motor has a high performance, its inertia may be felt by the user. The forces of inertia of the segment should therefore be compensated such that the latter is as transparent as possible for the user.

A known solution is to measure or to estimate the acceleration of the segment in question so as to estimate the force of inertia to which this segment is subjected in order to compensate for the latter. The acceleration is a signal that is difficult to acquire. A known solution is to estimate the acceleration based on a position signal to which a double derivation is applied. The signal thus obtained is particularly irregular and requires a powerful filtering which reduces the performance of a control intended to compensate for the force of inertia.

AIM OF THE INVENTION

The aim of the invention is to provide a control method allowing the inertia of the actuator to be compensated.

DESCRIPTION OF THE INVENTION

With a view to achieving this aim, a method is provided for controlling an actuator of an articulated segment comprising the steps for:
  Estimating an inertia J of the segment and a minimum articulation viscous friction f;
  Estimating or measuring a speed of movement $\dot{x}$ of the segment and an internal deformation $\Delta X$ of the actuator;
  Synthesizing a control law of the $H_\infty$ type generating a control torque using these estimations or measurements and meeting a performance objective relating to a transfer function $$G(s) = \frac{\ddot{x}}{F}$$

between an acceleration $\ddot{x}$ of the segment and an external force F applied to the segment: $\|G(s)W_s(s)\|_\infty \leq 1$ with $$W_s(s) = \left(\frac{s+\varepsilon}{Js+f}\right)^{-1},$$

$\varepsilon$ being a mathematical artifact and s the Laplace variable;
  Controlling the actuator of the articulated segment according to the control law thus synthesized.

The threshold function $W_s$ corresponds to an infinitely rigid system, with no internal deformation. Thus, the achievement of the performance objective allows the effects of the flexibility inherent in the actuation of the segment (due for example to the elasticity of the cable if the actuator is a cable-driven jack) to be eradicated.

According to one particular aspect of the invention, the synthesis of the control is carried out under at least one of the following constraints:
  a constraint relating to the power supply current (or control torque) of the motor which must not exceed a given threshold for all the admissible forces;
  a constraint relating to the positions of the poles of the control law which must all be situated below a threshold frequency lower than the Nyquist frequency;
  a passivity constraint according to which the force/speed transfer function must be a positive real number.

BRIEF DESCRIPTION OF THE DRAWINGS

The invention will be better understood in the light of the description that follows of one particular non-limiting embodiment of the invention, with reference to the figures of the appended drawings amongst which.

DETAILED DESCRIPTION OF EMBODIMENT OF THE INVENTION

Figure 1:
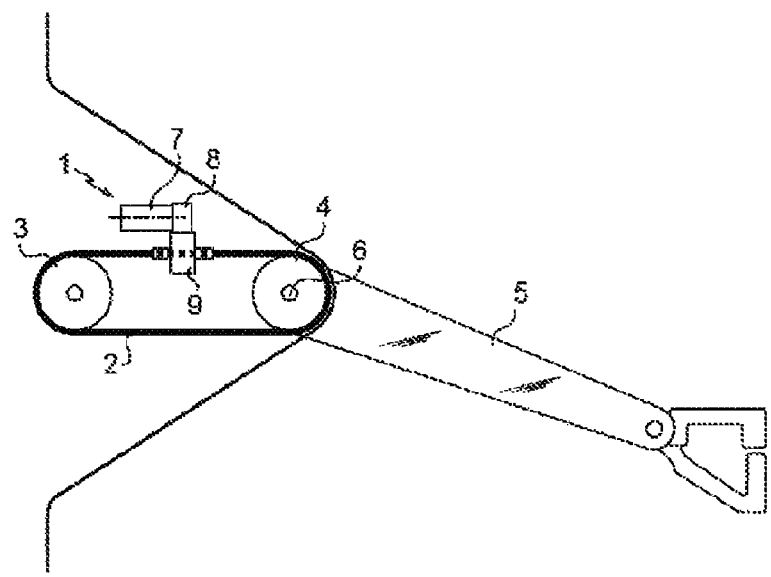
FIG. 1 is a schematic view of a segment of arm of a co-manipulator actuated by means of a cable-driven actuator.

With reference to the figures, the invention is applied here to the control of an articulated segment of a robot arm usable in co-manipulation mode. The robot comprises an actuator 1 displacing a cable 2 wound around a mule pulley 3 and an articulation pulley 4 driving a segment 5 articulated about an articulation axis 6. The actuator here comprises a motor 7 associated with a reducer 8 which drives the nut of a ball-screw transmission 9 whose socket head screw is hitched to the cable 2 which passes inside the screw.

According to the invention, the inertia J of the articulated segment 5 about the articulation axis 6 is firstly estimated. Various methods are known for estimating this inertia. Starting from the definition of the segment, the specific inertias of all the elements composing the segment may, for example, be translated into an inertia about the articulation axis 6 and all these inertias summed.

Then, a viscous friction at constant speed is estimated. This is done by measuring the torque f resisting the movement of the segment when the actuator 1 moves the latter at constant speed $\dot{\theta}$.

Finally, a stiffness k of the transmission between the motor 7 and the articulation pulley 4 (essentially determined by the stiffness of the cable 2) is estimated. For this, the torque exerted on the articulation pulley is traced while the latter is blocked as a function of the angular position of the drive shaft of the motor 7. A stiffness k is deduced from this.

The method of the invention comprises the step for synthesizing a control law for the actuator 1 such that the articulated segment 5 behaves as if the transmission between the motor 7 and the articulation pulley 7 were infinitely rigid, which amounts for the user to eliminating any undesirable effect due to the flexibility of the transmission.

For this purpose, the transfer function $$G(s) = \frac{\ddot{X}}{F}$$

is measured, where $\tilde{X}$ the acceleration of the articulated segment 5, and F is the external force acting on the articulated segment 5 (for example, the weight of a load that the segment is lifting). The variable s is the Laplace variable. According to one important aspect of the invention, the acceleration is not measured directly, but recomposed by means of a model. For this purpose, a speed $\dot{X}$ of movement of the segment, together with an internal deformation $\Delta X$, is firstly measured or estimated. This deformation can for example be estimated by measuring the position X of the segment and by estimating, based on the angular position of the actuation motor, a position $\overline{X}$ which would be that of the segment if the transmission were infinitely rigid. The difference $\Delta X = X - \overline{X}$ corresponds to the internal deformation. The multiplication of the internal deformation $\Delta X$ by the stiffness k, estimated beforehand, yields an estimation of the internal stress. It is accordingly then possible to estimate the transfer function G(s).

Figure 3:
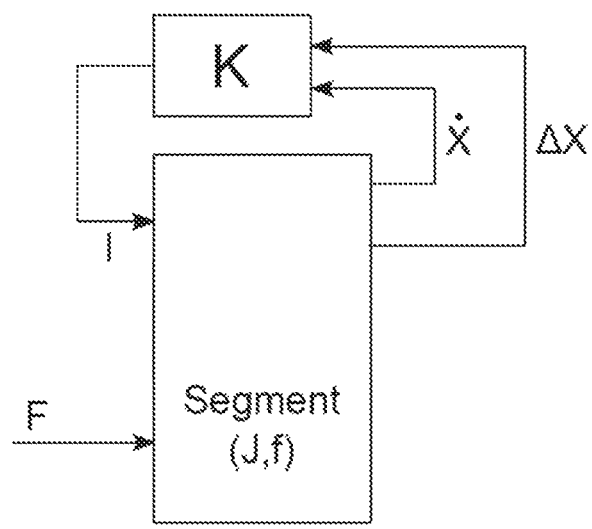
FIG. 3 is a block diagram of the closed-loop control implemented by means of the invention.

Using the conventional tools of the $H_\infty$ synthesis, a control law K is determined whose inputs are the speed $\dot{X}$ and the internal deformation $\Delta X$ and whose output is a control torque, here represented by a control current (or torque) I, as is shown schematically in FIG. 3. The synthesis meets the following objective: $\|G(s)W_s\|_\infty \leq 1$ with $$W_s = \left(\frac{s+\varepsilon}{Js+f}\right)^{-1},$$

Figure 2:
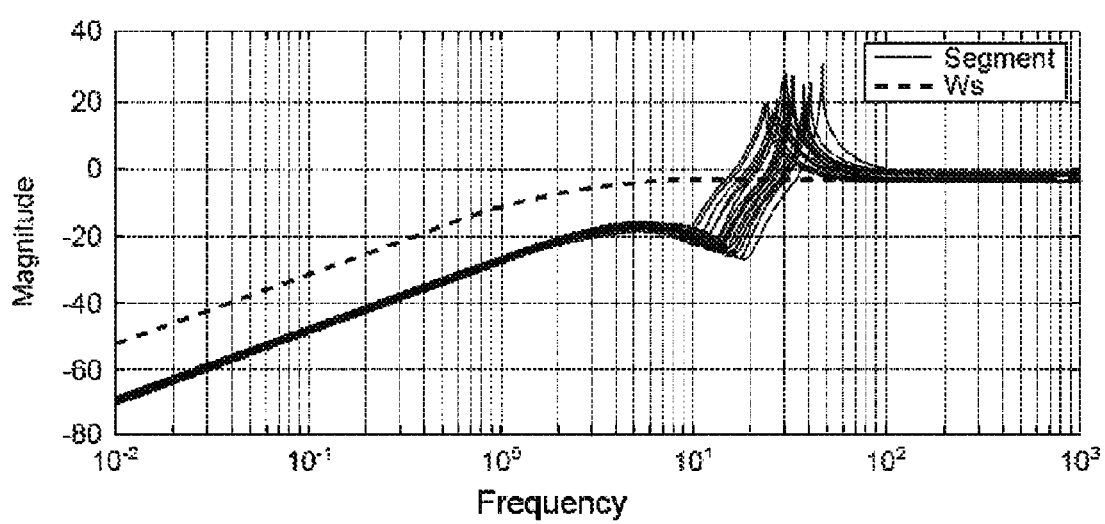
FIG. 2 is a graph showing the Bode diagram of the segment and the threshold function.

$\varepsilon$ being a mathematical artifact and s the Laplace variable. In other words, on a Bode diagram, the characteristic of the transfer function G(s) is underneath the characteristic of the threshold function $W_s(s)$. On the Bode diagram in FIG. 2, the fine lines illustrate the behavior of the articulated segment in the absence of the control according to the invention, and the thick dashed line the threshold function $W_s(s)$. One of the aims of the method of the invention is to eradicate the peaks due to the flexibility of the transmission, so as to obtain a behavior of the arm close to the threshold function $W_s(s)$.

Furthermore, and according to one particular aspect of the invention, at least one of the following constraints is imposed:

a constraint relating to the power supply current (or control torque) of the motor which must not exceed a given threshold for all the admissible forces. This constraint is met by imposing that $$\left|\frac{I}{F}\right|_\infty \leq S,$$

where I is the intensity of the current powering the motor of the actuator (or the torque demand on the motor), and S a given threshold;

a constraint relating to the positions of the poles of the control law which must all be situated below a threshold frequency $F_s$ lower than or equal to the Nyquist frequency;

a passivity constraint according to which the force/speed transfer function $$H = \frac{F}{\dot{X}}$$

must be a positive real number. It is recalled that a transfer function H is positive and real if $$\left|\frac{\alpha - H}{\alpha + H}\right|_\infty < 1,$$

or $\alpha$ is a strictly positive real number.

Then, once the control law has been synthesized as has just been stated, this control law is used for controlling the actuator.

The invention is not limited to what has just been described but, on the contrary, encompasses any variant within the scope as defined by the claims. In particular, the inertial characteristics (position, speed acceleration) of the segment of arm may relate to both linear movements as well as to angular movements.

The invention claimed is:

1. A method for controlling an actuator of an articulated segment comprising the following steps:
   estimating an inertia J of the articulated segment and a minimum articulation viscous friction f;
   estimating or measuring a speed of movement $\dot{X}$ of the articulated segment and an internal deformation $\Delta X$ of the actuator;
   synthesizing a control law of the $H_\infty$ type generating a control torque based on these estimations or measurements and meeting a performance objective relating to a transfer function $$G(s) = \frac{\ddot{X}}{F}$$

between an acceleration $\ddot{X}$ of the articulated segment and an external force F applied to the articulated segment: $\|G(s)W_s(s)\|_\infty \leq 1$ with $$W_s(s) = \left(\frac{s+\varepsilon}{Js+f}\right)^{-1},$$

$\varepsilon$ being a mathematical artifact and s the Laplace variable;
applying constraint to solve the performance objective relating to the transfer function;

controlling the actuator of the articulated segment according to the control law thus synthesized.

2. The method for controlling the actuator as claimed in claim 1, in which, the synthesis of the control law is carried out under at least one of the following constraints:
- a constraint relating to the control torque of the motor which must not exceed a given threshold for all the admissible forces;
- a constraint relating to the positions of the poles of the control law which must all be situated below a threshold frequency lower than or equal to a Nyquist frequency;
- a passivity constraint according to which the force/speed transfer function must be a positive real number.

* * * * *